US008811316B2

(12) United States Patent
Sun et al.

(10) Patent No.: US 8,811,316 B2
(45) Date of Patent: Aug. 19, 2014

(54) METHODS AND APPARATUSES FOR MULTI-CELL COLLABORATIVE COMMUNICATION IN A MULTIPLE INPUT MULTIPLE OUTPUT SYSTEM

(75) Inventors: Fanglei Sun, Shanghai (CN); Mingli You, Shanghai (CN); Jin Liu, Shanghai (CN); Yan Zhao, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 103 days.

(21) Appl. No.: 13/257,215

(22) PCT Filed: Mar. 16, 2010

(86) PCT No.: PCT/CN2010/071064
§ 371 (c)(1),
(2), (4) Date: Sep. 16, 2011

(87) PCT Pub. No.: WO2010/105549
PCT Pub. Date: Sep. 23, 2010

(65) Prior Publication Data
US 2012/0008565 A1 Jan. 12, 2012

(30) Foreign Application Priority Data
Mar. 17, 2009 (CN) .......................... 2009 1 0047830

(51) Int. Cl.
*H04W 4/00* (2009.01)
(52) U.S. Cl.
USPC ....................................................... 370/329
(58) Field of Classification Search
USPC ......... 370/310, 328–330, 336–338, 342–344, 370/348, 441, 442, 463; 455/422.1, 450, 455/451, 452.1, 452.2
See application file for complete search history.

(56) References Cited

U.S. PATENT DOCUMENTS

2006/0120477 A1 6/2006 Shen et al.
2007/0149236 A1* 6/2007 Naden et al. .................. 455/522
(Continued)

FOREIGN PATENT DOCUMENTS

| CN | 101095296 A | 12/2007 |
| CN | 101361289 A | 2/2009 |
| CN | 101370241 A | 2/2009 |
| WO | WO2008091897 A2 | 7/2008 |
| WO | WO2009024021 A1 | 2/2009 |

OTHER PUBLICATIONS

International Search Report for PCT/CN2010/071064 dated Jun. 24, 2010.

*Primary Examiner* — Andrew Chriss
*Assistant Examiner* — Peter Mak
(74) *Attorney, Agent, or Firm* — Fay Sharpe LLP

(57) ABSTRACT

A method and device for multiple-cell collaborative communication in a multiple input multiple output (MIMO) system are disclosed by the present invention. In said method, base stations participating in multiple-cell collaborative MIMO communication perform precoding and scheduling one by one. At first, a first base station selects the mobile terminals participating in the collaborative communication and performs transmission setting, including pre-coding setting; then the scheduling and setting results of the first base station are kept invariant, so that a second base station selects the mobile terminals participating in the collaborative communication and performs transmission setting, including pre-coding setting, according to the scheduling and setting results of the first base station. If a third base station participates in the multiple-cell collaborative MIMO communication, the scheduling and setting results of the first and second base stations are kept invariant, so that the third base station selects the mobile terminals participating in the collaborative communication and performs transmission setting, including pre-coding setting, according to the scheduling and setting results of the first and second base stations. Based on the gradual collaborative communication method, fully distributed multiple-cell collaborative MIMO communication can be achieved.

13 Claims, 6 Drawing Sheets

(56) References Cited

U.S. PATENT DOCUMENTS

| | | |
|---|---|---|
| 2007/0183380 A1* | 8/2007 | Rensburg et al. ............. 370/338 |
| 2007/0248172 A1 | 10/2007 | Mehta et al. |
| 2008/0175183 A1* | 7/2008 | Devroye et al. ............... 370/315 |
| 2009/0323849 A1* | 12/2009 | Bala et al. ..................... 375/267 |
| 2010/0027471 A1 | 2/2010 | Palanki et al. |
| 2010/0039951 A1* | 2/2010 | She et al. ...................... 370/252 |
| 2010/0142466 A1 | 6/2010 | Palanki et al. |
| 2010/0173660 A1 | 7/2010 | Liu et al. |
| 2011/0268007 A1* | 11/2011 | Barany et al. ................. 370/312 |

* cited by examiner

METHODS AND APPARATUSES FOR MULTI-CELL COLLABORATIVE COMMUNICATION IN A MULTIPLE INPUT MULTIPLE OUTPUT SYSTEM

FIELD OF THE INVENTION

The present invention generally relates to multiple input multiple output technology, and more particularly, to a technology of multiple input multiple output transmission performed collaboratively by multiple base stations.

BACKGROUND OF THE INVENTION

To increase user capacity of the system, existing radio communication networks usually adopt low frequency reuse factor, i.e., all the cells share the same time-frequency resources. However, inter-cell interferences caused by low frequency reuse factor are an important factor restricting downlink capacity. For a mobile terminal which is located at a cell edge (i.e., the area between neighboring cells), while receiving useful signals from the base station to which the mobile terminal pertains, it also receives signals transmitted by other base stations with the same time-frequency resources. And the signals from the other base stations constitute interferences to the mobile terminal.

In order to improve user performance at a cell edge without a loss of (or with an increase in) overall cell throughput, the applicant of the present invention has provided a multi-cell multiple input multiple output (multi-cell MIMO) technology.

Multi-cell MIMO is a technology family and has been proposed as a candidate technical solution for the Long Term Evolution (LTE) project and IEEE 802.16m. In multi-cell MIMO technology, a mobile terminal located at the collaboration area can be served by multiple base stations. By closely coordinating data transmission and reception of multiple base stations, multi-cell MIMO technology changes inter-cell interferences to useful signals, thereby breaking through the restriction from frequency spectrum efficiency in conventional cellular systems.

However, it should be noticed that, in a real-time system, information exchange in the backhaul network caused by multi-cell MIMO technology is a great overhead and results in problems such as additional delay.

Technical solutions of multi-cell MIO include technical solutions of centralized multi-cell MIMO, such as a network MIMO solution, which have high computational complexity.

Technical solutions of multi-cell MIMO also include technical solutions of distributed multi-cell MIMO, such as a collaborative MIMO solution. In multi-cell scheduling, it is still a great challenge to better define the collaboration strategy between neighboring cells, which directly affects the system gain of a distributed multi-cell MIMO system.

SUMMARY OF THE INVENTION

The present invention provides methods of and apparatuses for communicating in a MIMO system to solve the problem in the prior art.

FIG. 1 shows a schematic diagram illustrating a MIMO system according to an embodiment of the present invention. As shown in FIG. 1, base stations 1 and 2 are located in two neighboring cells, respectively, and provide mobile terminals 21 and 22 with collaborative MIMO transmission. FIG. 2 shows an equivalent channel model in the embodiment. As shown in FIG. 2, S1 represents a data steam transmitted by the base station 1 to the mobile terminal 21, and S2 represents a data steam transmitted by the base station 2 to the mobile terminal 22; $t_{ij}$ represents a pre-coding vector or matrix of a data stream Si at a base station j; $h_{ij}$ represents a channel state matrix between a mobile terminal $2i$ and a base station j. Then, the equivalent channels counting pre-coding from the data streams S1 and S2 to the mobile terminals 21 and 22 may be represented as follows:

$$\begin{bmatrix} h_{11} & h_{12} \\ h_{21} & h_{22} \end{bmatrix} \begin{bmatrix} t_{11} & t_{12} \\ t_{21} & t_{22} \end{bmatrix} = \begin{bmatrix} h_{11}t_{11} + h_{12}t_{21} & h_{11}t_{12} + h_{12}t_{22} \\ h_{21}t_{11} + h_{22}t_{21} & h_{21}t_{12} + h_{22}t_{22} \end{bmatrix}$$

As can be seen from the above formula, the equivalent channels between the two data streams and the two mobile terminals are closely related to inter-cell channels and pre-coding elements. In some prior art, complete channel state information and data information needs to be exchanged between collaborative base stations, thereby resulting in great backhaul transmission overhead and high computational complexity for pre-coding optimization. In the present invention, one important objective is to reduce the amount of information exchanged between collaborative base stations. For example, in the above embodiment, only the base station 2 transmits a pre-coded data stream S2', i.e., $t_{12}S2$, to the base station 1, and the base station 1 doesn't need to transmit the data stream S1 to the base station 2.

According to a first aspect of the present invention, a method of communicating in a multiple input multiple output communication system is provided. The method includes the steps of: determining to perform multi-cell multiple input multiple output collaboration by at least a first base station and a second base station; acquiring determined downlink transmission control information of the first base station by the second base station, wherein the determined downlink transmission control information includes the indication information of at least one determined mobile terminal in a cell in which the first base station is located; selecting collaborative mobile terminal(s) according to the downlink transmission control information of the first base station by the second base station; transmitting downlink data and downlink transmission control information of the selected collaborative mobile terminal(s) to the first base station by the second base station; adjusting downlink data transmission from the first base station to the at least one determined mobile terminal according to the downlink data and the downlink transmission control information of the collaborative mobile terminal(s) by the first base station.

According to a second aspect of the present invention, a method of communicating in a base station in a multiple input multiple output communication system is provided. The method includes the steps of: A. acquiring determined downlink transmission control information of at least one determined cell, wherein the determined downlink transmission control information includes the indication information of at least one determined mobile terminal in each of the at least one determined cell; B. selecting collaborative mobile terminal(s) in a cell to which the base station pertains according to the downlink transmission control information of the at least one determined cell; C. transmitting downlink data and downlink transmission control information of the selected collaborative mobile terminal(s) to base station(s) in the at least one determined cell.

According to a third aspect of the present invention, a method of communicating in a base station in a multiple input multiple output communication system is provided. The method includes the steps of: a. transmitting to at least one other base station the determined downlink transmission control information of a cell in which the base station is located, wherein the determined downlink transmission control information includes the indication information of at least one determined mobile terminal in the cell in which the base station is located: b. acquiring downlink data and downlink transmission control information of selected collaborative mobile terminal(s) from the at least one other base station: c. adjusting downlink data transmission from the base station to the at least one determined mobile terminal according to the downlink data and the downlink transmission control information of the collaborative mobile terminal(s).

According to a fourth aspect of the present invention, a first communication apparatus for communicating in a base station in a multiple input multiple output communication system is provided. The first communication apparatus includes: a first acquiring device for acquiring determined downlink transmission control information of at least one determined cell, wherein the determined downlink transmission control information includes a downlink pre-coding matrix between a base station in each of the at least one determined cell and at least one determined mobile terminal, and the indication information of the at least one determined mobile terminal; a first determining device for selecting collaborative mobile terminal(s) in a cell to which the base station pertains according to the downlink transmission control information of the at least one determined cell; a first transmitting device for transmitting downlink data and downlink transmission control information of the selected collaborative mobile terminal(s) to base station(s) in the at least one determined cell.

According to a fifth aspect of the present invention, a second communication apparatus for communicating in abuse station in a multiple input multiple output communication system is provided. The second communication apparatus includes: a second transmitting device for transmitting to at least one other base station the determined downlink transmission control information of a cell in which the base station is located, wherein the determined downlink transmission control information includes a downlink pre-coding matrix between the cell in which the base station is located and at least one determined mobile terminal, and the indication information of the at least one determined mobile terminal; a second acquiring device for acquiring downlink data and downlink transmission control information of selected collaborative mobile terminal(s) from the at least one other base station; a first adjusting device for adjusting downlink data transmission from the base station to the at least one determined mobile terminal according to the downlink data and the downlink transmission control information of the collaborative mobile terminal(s).

By employing the methods and apparatuses of the present invention, a radio communication network using multiple base station MIMO technology will have the following features: the amount of information exchanged between base stations is greatly reduced during multiple base station collaborative MIMO transmission; inter-cell interferences are efficiently suppressed; since one or more base station serves multiple users with the same time-frequency resources and suppressed inter-user interferences, system throughput is increased.

BRIEF DESCRIPTION OF THE DRAWINGS

Other features, objectives and advantages of the present invention will become more apparent after reading the following detailed description of non-limiting embodiments, with reference to the accompanying drawings, wherein below.

wherein the same or similar reference numerals represent the same or similar step features or devices (modules).

DETAILED DESCRIPTION OF PREFERRED EMBODIMENTS

Figure 3:
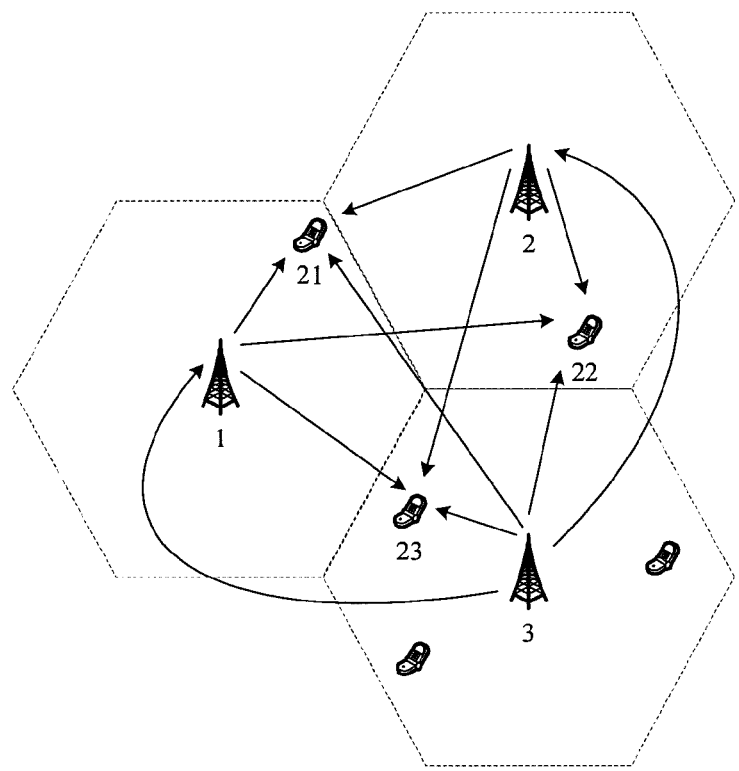
FIG. 3 is a schematic diagram illustrating a MIMO system according to an embodiment of the present invention.

FIG. 3 shows a schematic diagram illustrating a MIMO system according to an embodiment of the present invention. As shown in FIG. 3, base stations 1, 2, and 3 are located in three neighboring cells, respectively, and provide mobile terminals 21, 22 and 23 with collaborative MIMO transmission.

Figure 4:
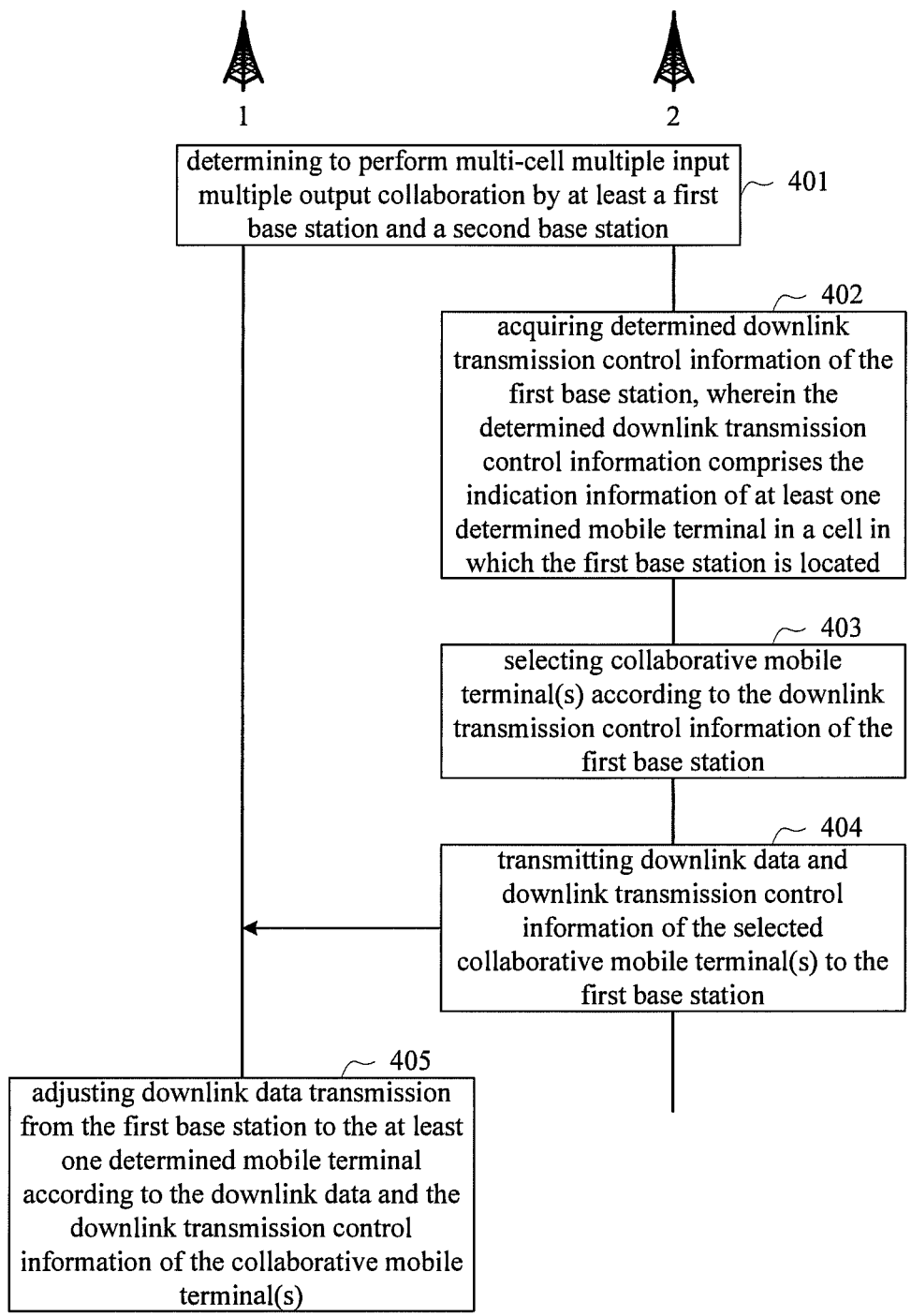
FIG. 4 is a flowchart illustrating a method of communicating in a multiple input multiple output communication system according to an embodiment of the present invention.

FIG. 4 is a flowchart illustrating a method of communicating in a multiple input multiple output communication system according to an embodiment of the present invention. The present invention will be described from the system point of view as follows in connection with FIGS. 1, 2 and 4.

In the step 401, the system determines to perform multi-cell MIMO collaboration by at least a first base station and a second base station.

Specifically, the base station 1 provides the mobile terminal 21 with MIMO transmission. When the mobile terminal 21 moves into the overlapping area of signals from the base stations 1 and 2, i.e., the collaboration area of the base stations 1 and 2, the system determines to perform multi-cell MIMO collaboration by the base stations 1 and 2, wherein the base station 1 corresponds to the first base station, and the base station 2 corresponds to the second base station.

In the step 402, the second base station acquires determined downlink transmission control information of the first base station, wherein the determined downlink transmission control information includes the indication information of at least one determined mobile terminal in a cell in which the first base station is located.

Specifically, the base station 1 retains a pre-coding $t_{11}$ during data transmission to the mobile terminal 21, and the base station 2 acquires the indication information of the mobile terminal 21 thereby knowing that the mobile terminal 21 will participate in multi-cell collaboration.

According to different interaction mode employed between base stations, in some other embodiments of the present invention, the determined downlink transmission control information may further include one or more of channel information and downlink pre-coding information between base station(s) in determined cell(s) and determined mobile terminal(s).

In the step 403, the second base station selects collaborative mobile terminal(s) according to the downlink transmission control information of the first base station.

Specifically, the base station 2 selects the mobile terminal 22 as a collaborative mobile terminal in the cell in which the base station 2 is located according to the indication information of the mobile terminal 21.

In the step 404, the second base station transmits downlink data and downlink transmission control information of the selected collaborative mobile terminal(s) to the first base station.

Specifically, the base station 2 transmits to the base station 1 the pre-coded data stream S2' transmitted to the mobile terminal 22 and the indication information of the mobile terminal 22.

According to different interaction mode employed between base stations, in some other embodiments of the present invention, the downlink transmission control information of the collaborative mobile terminal(s) may further include one or more of channel information and downlink pre-coding information relating to the collaborative mobile terminal(s); and the downlink data of the collaborative mobile terminal(s) may be raw data or pre-coded data.

In the step 405, the first base station adjusts downlink data transmission from the first base station to the at least one determined mobile terminal according to the downlink data and the downlink transmission control information of the collaborative mobile terminal(s).

Specifically, the base station 1 adjusts the transmission of the data stream S1 according to the received data stream S2' and indication information of the mobile terminal 22, thereby realizing interference cancellation for the data stream S2. When adjusting the data stream S1, the pre-coding of the base station 1 for the mobile terminal 21 remains unchanged.

A fundamental method of the present invention is to schedule the base stations participating in multi-cell MIMO collaboration one by one. Firstly, the first base station selects mobile terminal(s) to participate in collaboration and performs transmission setting including pre-coding setting. Then, with the scheduling and setting results of the first base station being kept unchanged, according to the scheduling and setting results of the first base station, the second base station selects mobile terminal(s) to participate in collaboration and performs transmission setting including combined pre-coding setting. If there is a third base station participating in multi-cell MIMO collaboration, then with the scheduling and setting results of the first base station and the second base station being kept unchanged, according to the scheduling and setting results of the first base station and the second base station, the third base station selects mobile terminal(s) to participate in collaboration and performs transmission setting including combined pre-coding setting. If there are other base stations participating in multi-cell MIMO collaboration, then the rest can be done in the same manner.

Figure 5:
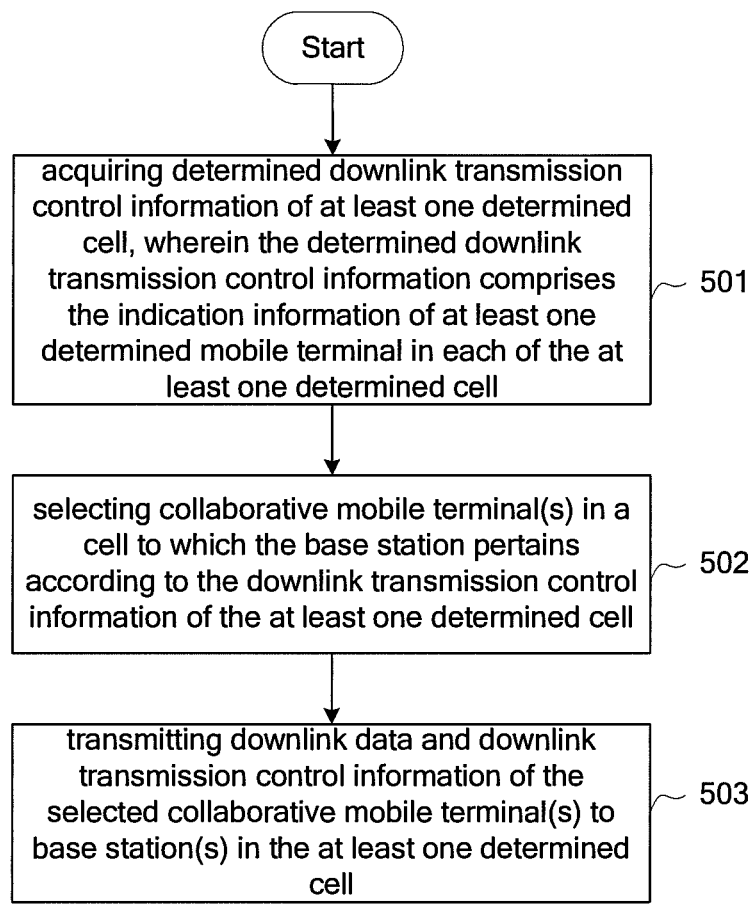
FIG. 5 is a flowchart illustrating a method of communicating in a base station in a multiple input multiple output communication system according to an embodiment of the present invention.
Figure 6:
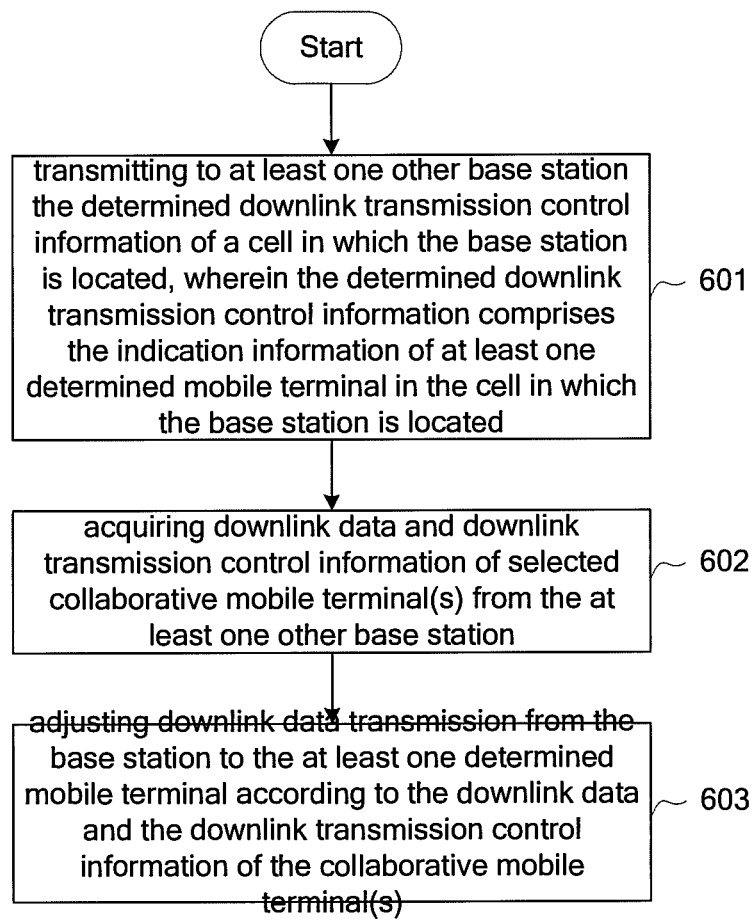
FIG. 6 is a flowchart illustrating a method of communicating in a base station in a multiple input multiple output communication system according to an embodiment of the present invention.

FIG. 5 is a flowchart illustrating a method of communicating in a base station in a multiple input multiple output communication system according to an embodiment of the present invention. And FIG. 6 is a flowchart illustrating a method of communicating in a base station in a multiple input multiple output communication system according to an embodiment of the present invention. The present invention will be described from the base station point of view as follows in connection with FIGS. 1, 2, 3, 5 and 6.

In the step 501, a base station most recently joining in multi-cell MIMO collaboration acquires determined downlink transmission control information of at least one determined cell, wherein the determined downlink transmission control information includes the indication information of at least one determined mobile terminal in each of the at least one determined cell.

For example, multi-cell MIMO collaboration is performed between the base station 1 and the base station 2, and the base station 1 has completed user scheduling and transmission setting including pre-coding setting, wherein the mobile terminal 21 is involved in multi-cell MIMO collaboration, then, the cell in which the base station 1 is located is called a determined cell, and the mobile terminal 21 is called a determined mobile terminal. The base station 2 acquires the indication information of the mobile terminal 21, thereby knowing that the mobile terminal 21 will participate in multi-cell collaboration.

For another example, multi-cell MO collaboration is performed among the base stations 1, 2 and 3, and the base stations 1 and 2 have completed user scheduling and transmission setting including pre-coding setting, wherein the mobile terminals 21 and 22 are involved in multi-cell MIMO collaboration, then, the cells in which the base stations 1 and 2 are located are called determined cells, and the mobile terminals 21 and 22 are called determined mobile terminals. The base station 3 acquires the indication information of the mobile terminals 21 and 22, thereby knowing that the mobile terminals 21 and 22 will participate in multi-cell collaboration.

According to different interaction mode employed between base stations, in some other embodiments of the present invention, the determined downlink transmission control information may further include one or more of channel information and downlink pre-coding information between base station(s) in determined cell(s) and determined mobile terminal(s).

In the step 502, the base station most recently joining in multi-cell MIMO collaboration selects collaborative mobile terminal(s) in a cell to which the base station pertains according to the downlink transmission control information of the at least one determined cell.

For example, multi-cell MIMO collaboration is performed between the base station 1 and the base station 2, and the base station 2 is the base station most recently joining in multi-cell MEMO collaboration, then according to the downlink transmission control information of the cell in which the base station 1 is located, the base station 2 makes a selection from the mobile terminals in the cell in which the base station 2 is located, and determines the mobile terminal 22 as a collaborative mobile terminal.

For another example, multi-cell MIMO collaboration is performed among the base stations 1, 2 and 3, and the base station 3 is the base station most recently joining in multi-cell MIMO collaboration, then according to the downlink transmission control information of the cells in which the base stations 1 and 2 are located, the base station 3 makes a selection from the mobile terminals in the cell in which the base station 3 is located, and determines the mobile terminal 23 as a collaborative mobile terminal.

In the step 503, the base station most recently joining in multi-cell MIMO collaboration transmits downlink data and downlink transmission control information of the selected collaborative mobile terminal(s) to base station(s) in the at least one determined cell.

For example, multi-cell MIMO collaboration is performed between the base station 1 and the base station 2, and the base station 2 is the base station most recently joining in multi-cell MIMO collaboration, and the collaborative mobile terminal determined by the base station 2 is the mobile terminal 22, then, the base station 2 transmits to the base station 1 the pre-coded data transmitted to the mobile terminal 22 and the downlink transmission control information of the mobile terminal 22.

For another example, multi-cell MEMO collaboration is performed among the base stations 1, 2 and 3, and the base station 3 is the base station most recently joining in multi-cell MIMO collaboration, and the collaborative mobile terminal determined by the base station 3 is the mobile terminal 23, then, the base station 3 transmits to the base stations 1 and 2 the pre-coded data transmitted to the mobile terminal 3 and the downlink transmission control information of the mobile terminal 23.

According to different interaction mode employed between base stations, in some other embodiments of the present invention, the downlink transmission control information of the collaborative mobile terminal(s) may further include one or more of channel information and downlink pre-coding information relating to the collaborative mobile terminal(s); and the downlink data of the collaborative mobile terminal(s) may be raw data or pre-coded data.

In the step 601, the base station in a determined cell participating in multi-cell MIMO collaboration transmits to a base station most recently joining in multi-cell MIMO collaboration the determined downlink transmission control information of the cell, wherein the determined downlink transmission control information includes the indication information of at least one determined mobile terminal in the determined cell.

For example, multi-cell MIMO collaboration is performed between the base station 1 and the base station 2, and the cell in which the base station 1 is located is a determined cell, and the mobile terminal 21 is a determined mobile terminal, the base station 2 needs to determine mobile terminal(s) to participate in multi-cell MIMO collaboration in the cell in which it is located and transmission setting of the mobile terminal(s). Then, the base station 1 transmits the indication information of the mobile terminal 21 to the base station 2.

For another example, multi-cell MIMO collaboration is performed among the base stations 1, 2 and 3, and the cells in which the base stations 1 and 2 are located are determined cells, and the mobile terminals 21 and 22 are determined mobile terminals, the base station 3 needs to determine mobile terminal(s) to participate in multi-cell MIMO collaboration in the cell in which it is located and transmission setting of the mobile terminal(s). Then, the base stations 1 and 2 transmit the indication information of the mobile terminals 21 and 22, respectively, to the base station 3.

According to different interaction mode employed between base stations, in some other embodiments of the present invention, the determined downlink transmission control information may further include one or more of channel information and downlink pre-coding information between base station(s) in determined cell(s) and determined mobile terminal(s).

In the step 602, the base station in the determined cell acquires downlink data and downlink transmission control information of selected collaborative mobile terminal(s) from the base station most recently joining in multi-cell MIMO collaboration.

For example, multi-cell MIMO collaboration is performed between the base station 1 and the base station 2, and the cell in which the base station 1 is located is a determined cell, then the base station 1 acquires downlink data and downlink transmission control information of selected collaborative mobile terminal(s) from the base station 2.

For another example, multi-cell MIMO collaboration is performed among the base stations 1, 2 and 3, and the cells in which the base stations 1 and 2 are located are determined cells, then the base stations 1 and 2 acquire downlink data and downlink transmission control information of selected collaborative mobile terminal(s) from the base station 3.

According to different interaction mode employed between base stations, in some other embodiments of the present invention, the downlink transmission control information of the collaborative mobile terminal(s) may further include one or more of channel information and downlink pre-coding information relating to the collaborative mobile terminal(s); and the downlink data of the collaborative mobile terminal(s) may be raw data or pre-coded data.

In the step 603, the base station in the determined cell adjusts downlink data transmission from the determined base station to the at least one determined mobile terminal according to the downlink data and the downlink transmission control information of the collaborative mobile terminal(s).

For example, multi-cell MIMO collaboration is performed between the base station 1 and the base station 2, and the cell in which the base station 1 is located is a determined cell, and the mobile terminal 21 is a determined mobile terminal, then the base station 1 adjusts downlink data transmission to the mobile terminal 21 according to the downlink data and the downlink transmission control information of the collaborative mobile terminal(s) determined by the base station 2, thereby performing interference cancellation. When adjusting the data transmission, the pre-coding of the base station 1 for the mobile terminal 21 remains unchanged.

For another example, multi-cell MIMO collaboration is performed among the base stations 1, 2 and 3, and the cells in which the base stations 1 and 2 are located are determined cells, and the mobile terminals 21 and 22 are determined mobile terminals, then the base stations 1 and 2 adjust downlink data transmission to the mobile terminals 21 and 22, respectively, according to the downlink data and the downlink transmission control information of the collaborative mobile terminal(s) determined by the base station 3, thereby performing interference cancellation. When adjusting the data transmission, the pre-codings of the base station 1 for the mobile terminal 21 and the base station 2 for the mobile terminal 21 remain unchanged.

Similar specific operation may be employed in the aforementioned steps 403 and 502. The procedure of selecting collaborative mobile terminal(s) by a base station joining in multi-cell MIMO collaboration will be described in detail as follows.

Take two-cell MIMO collaboration between the base stations 1 and 2 for example, wherein the cell in which the base station 1 is located is a determined cell and the mobile terminal 21 is a determined terminal. Then, the detailed steps of selecting collaborative mobile terminal(s) by the base station 2 are as follows.

Firstly, the base station 2 determines an optimum pre-coding for at least one mobile terminal in the cell in which the base station 2 is located. The downlink pre-coding matrix between the base station 1 and the mobile terminal 21 is t'$_1$. The combined downlink pre-coding matrix between the base stations 1 and 2 and the mobile terminal 21 and any mobile terminal in the cell in which the base station 2 is located may be represented by:

$$T_2 = [\, t''_1 \quad t''_2 \,] = \begin{bmatrix} t''_{11} & t''_{12} \\ t''_{21} & t''_{22} \end{bmatrix}.$$

Since the base station 1 doesn't notify the base station 2 of the data stream S1 transmitted to the mobile terminal 21, it follows that t"$_{21}$=0. The combined pre-coding matrix $T_2$ is a block upper triangular matrix. In order to retain the transmission setting in the cell in which the base station 1 is located, it follows that t"$_{11}$=t'$_1$. The equivalent channels between the two base stations and the two mobile terminals may be represented by:

$$\begin{bmatrix} H'_1 \\ H'_2 \end{bmatrix} = \begin{bmatrix} h_{11} t'_1 & h_{12} \\ h_{21} t'_1 & h_{22} \end{bmatrix}.$$

Then, based on a first predetermined rule, the base station 2 determines an optimum pre-coding for each of the at least one mobile terminal in the cell in which the base station 2 is located.

According to an embodiment of the present invention, the first predetermined rule is a decision criteria based on signal to jamming and noise ratio (SJNR).

In a multi-user MIMO system with K users, the interference power of the k-th user is defined as the total interference power caused by the k-th user and received by other users, which may be represented by $$J_k = \sum_{i=1, i \neq k}^{K} t_k^H H_i^H H_i t_k.$$

Here, $t_k$ is an M×1 pre-coding vector of the k-th user, and the MIMO channel of the k-th user is an $N_i$×M matrix $H_i$. Since the SJNR of different users are independent, the pre-codings of the different users may be designed separately. The criteria to determine pre-coding based on maximum SJNR may be represented by the formula:

$$\max_{t_k}(SJNR_k) = \frac{t_k^H H_k^H H_k t_k}{t_k^H \left( \sum_{i=1, i \neq k}^{K} H_i^H H_i \right) t_k + N_0} \quad (1)$$

According to "*Matrix Analysis Communications*" (R. A. Horn and C. R. Johnson, Cambridge University Press, U.S.A., 1985), the optimum pre-coding $t_k$ of the k-th user is a characteristic vector corresponding to the maximum characteristic value of a matrix pair of $H_k^H H_k$ and $$\sum_{i=1, i \neq k}^{K} H_i^H H_i + N_0 / P_k I.$$

And according to "*Matrix Computations*" (G. H. Golub and C. F. V. Loan, 3$^{rd}$ ed., London: Johns Hopkins University Press, 1996), when the latter of the above matrix pair is an invertible matrix, the result of optimum pre-coding may be represented by:

$$t_k = \sqrt{P_k} \times \zeta_m(Y_k),$$

where $\zeta_m(Y_k)$ is a characteristic vector corresponding to the maximum characteristic value of $Y_k$, $P_k$ is the transter power of the k-th user, and $$Y_k = \left( \sum_{i=1, i \neq k}^{K} H_i^H H_i + \frac{N_0}{P_k} I \right)^{-1} H_k^H H_k.$$

In the above case of two-cell MEMO collaboration, the optimum pre-coding determined by the base station 2 for a mobile terminal is $$t''_2 = \sqrt{P_2} \times \zeta_m \left( \left( (H''_1)^H H''_1 + \frac{N_0}{P_2} I \right)^{-1} (H''_2)^H H''_2 \right).$$

According to another embodiment of the present invention, the first predetermined rule is a decision criteria based on block diagonalization.

For a MIMO channel with multiple users, to satisfy block diagonalization is meant to seek out a null space of the subspace composed of other users' channels for a certain user, which is represented by the formula: $H_i G_j$=0, (i≠j), where $G_j$ is the pre-coding matrix of the j-th user.

In downlink block diagonalization algorithm, the pre-coding matrix of the k-th user is the product of two matrixes:

$$G_k = \tilde{V}_k^{(0)} V_k^{(1)},$$

where $\tilde{V}_k^{(0)}$ is in a null space of other channel spaces, and represented by $H_j \tilde{V}_k^{(0)}$=0, j≠k, and $V_k^{(1)}$ is a right-unitary matrix after singular value decomposition of $H_k \tilde{V}_k^{(0)}$.

In the above case of two-cell MIMO collaboration, the optimum pre-coding determined by the base station 2 for a mobile terminal is t"$_2$=$\tilde{V}_2^{(0)} V_2^{(1)}$, where $\tilde{V}_2^{(0)}$ is in a null space of the channel space of the mobile terminal 21, i.e., $H'_1 \tilde{V}_2^{(0)}$=0, j≈k, and $V_2^{(1)}$ is a right-unitary matrix after singular value decomposition of $H''_2 \tilde{V}_2^{(0)}$. That is to say, the combined downlink pre-coding matrix $T_2$ satisfies block diagonalization.

According to yet another embodiment of the present invention, the predetermined first rule may be a decision criteria based on maximum signal to noise ratio.

And then, based on a second predetermined rule, the base station 2 selects the collaborative mobile terminal(s) from at least one mobile terminal with determined optimum pre-coding.

According to an embodiment of the present invention, the second predetermined rule is to maximize system throughput.

According to another embodiment of the present invention, the second predetermined rule is to satisfy fairness among the mobile terminals.

Figure 1:
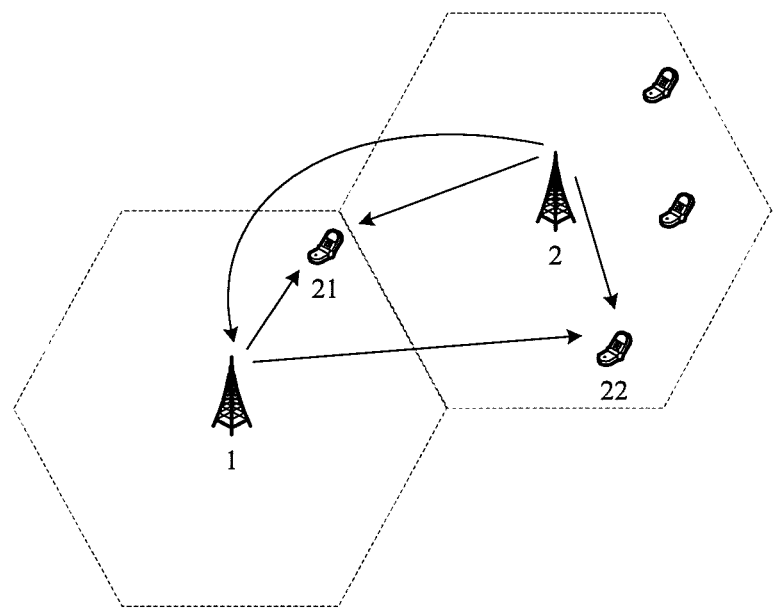
FIG. 1 is a schematic diagram illustrating a MIMO system according to an embodiment of the present invention.
Figure 2:
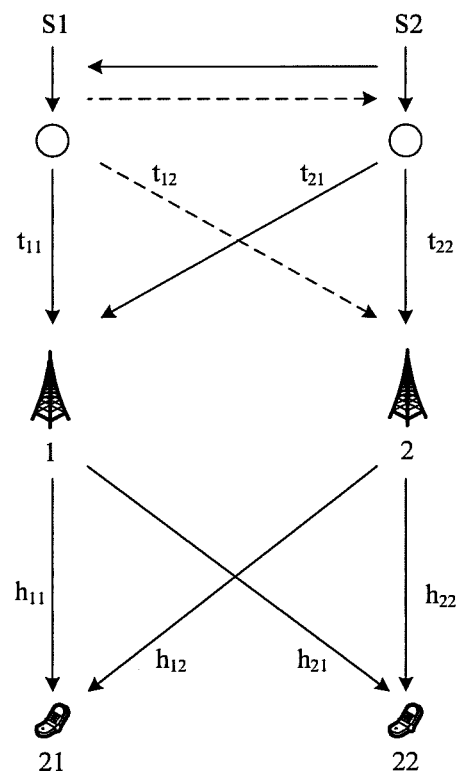
FIG. 2 is an equivalent channel model according to an embodiment of the present invention.

As shown in FIG. 1, the determined collaborative mobile terminal is the mobile terminal 22, for example.

Take three-cell MIMO collaboration among the base stations 1, 2 and 3 for example, wherein the cells in which the base stations 1 and 2 are located are determined cells and the mobile terminals 21 and 22 are determined terminals. Then, the detailed steps of selecting collaborative mobile terminal(s) by the base station 3 are as follows.

Firstly, the base station 3 determines an optimum pre-coding for at least one mobile terminal in the cell in which the base station 3 is located. The combined downlink pre-coding matrix between the base stations 1, 2 and 3 and the mobile terminals 21, 22, and any mobile terminal in the cell in which the base station 3 is located may be represented by:

$$T_3 = [t_1''' \ t_2''' \ t_3'''] = \begin{bmatrix} t_{11}''' & t_{12}''' & t_{13}''' \\ t_{21}''' & t_{22}''' & t_{23}''' \\ t_{31}''' & t_{32}''' & t_{33}''' \end{bmatrix}.$$

The base station 1 doesn't notify the base station 3 of the data stream S1 transmitted to the mobile terminal 21, and the base station 2 doesn't notify the base station 3 of the data stream S2 transmitted to the mobile terminal 22. The combined pre-coding matrix $T_3$ is a block upper triangular matrix. In order to retain the transmission setting in the cells in which the base stations 1 and 2 are located, it follows that $$t_1''' = \begin{bmatrix} t_1' \\ 0 \\ 0 \end{bmatrix}, t_2''' = \begin{bmatrix} t_{12}'' \\ t_{22}'' \\ 0 \end{bmatrix}.$$

The equivalent channels between the three base stations and the three mobile terminals are updated as:

$$\begin{bmatrix} H_1''' \\ H_2''' \\ H_3''' \end{bmatrix} = \begin{bmatrix} h_{11}t_1' & h_{11}t_{12}'' + h_{12}t_{22}'' & h_{13}''' \\ h_{21}t_1' & h_{21}t_{12}'' + h_{22}t_{22}'' & h_{23}''' \\ h_{31}t_1' & h_{31}t_{12}'' + h_{32}t_{22}'' & h_{33}''' \end{bmatrix}.$$

Then, based on a first predetermined rule, the base station 3 determines an optimum pre-coding for each of the at least one mobile terminal in the cell in which the base station 3 is located.

According to an embodiment of the present invention, the first predetermined rule is a decision criteria based on signal to jamming and noise ratio. In the above case of three-cell MIMO collaboration, based on the criteria of maximum SJNR, the optimum pre-coding determined by the base station 3 for a mobile terminal is $$t_3''' = \sqrt{P_3} \times \zeta \left( \left( (H_1''')^H H_1''' + (H_2''')^H H_2''' + \frac{N_0}{P_3} I \right)^{-1} (H_3''')^H H_3''' \right).$$

According to another embodiment of the present invention, the first predetermined rule is a decision criteria based on block diagonalization. In the above case of three-cell MIMO collaboration, based on the block diagonalization criteria, the optimum pre-coding determined by the base station 3 for a mobile terminal is $t_3''' = \tilde{V}_3^{(0)} V_3^{(1)}$ where $\tilde{V}_3^{(0)}$ is in a null space of the channel space of the mobile terminals 21 and 22, i.e., $$\begin{bmatrix} H_1''' \\ H_2''' \end{bmatrix} \tilde{V}_3^{(0)} = 0,$$

j≠k, and $V_3^{(1)}$ is a right-unitary matrix after singular value decomposition of $H'''_3 \tilde{V}_3^{(0)}$. That is to say, the combined downlink pre-coding matrix $T_3$ satisfies block diagonalization.

According to yet another embodiment of the present invention, the first predetermined rule is a decision criteria based on maximum signal to noise ratio.

And then, based on a second predetermined rule, the base station 3 selects the collaborative mobile terminal(s) from at least one mobile terminal with determined optimum pre-coding.

According to an embodiment of the present invention, the second predetermined rule is to maximize system throughput.

According to another embodiment of the present invention, the second predetermined rule is to satisfy fairness among the mobile terminals.

As shown in FIG. 3, the collaborative mobile terminal determined is the mobile terminal 23, for example.

In the above embodiments, there are only one mobile terminal and one data stream participating in multi-cell MIMO collaboration in the cell in which each base station is located. However, those skilled in the art will understand that, it is not a limitation to the present invention, and there may be a plurality of mobile terminals and data streams participating in multi-cell MIMO collaboration in the cell in which each base station is located.

Figure 7:
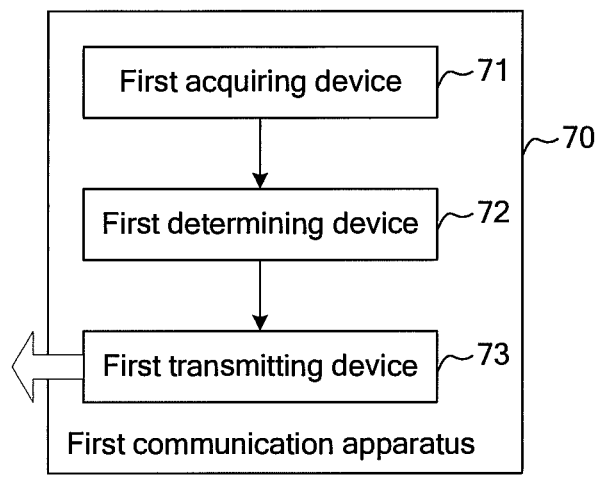
FIG. 7 is a block diagram illustrating a first communication apparatus for communicating in a base station in a multiple input multiple output communication system according to an embodiment of the present invention.
Figure 8:
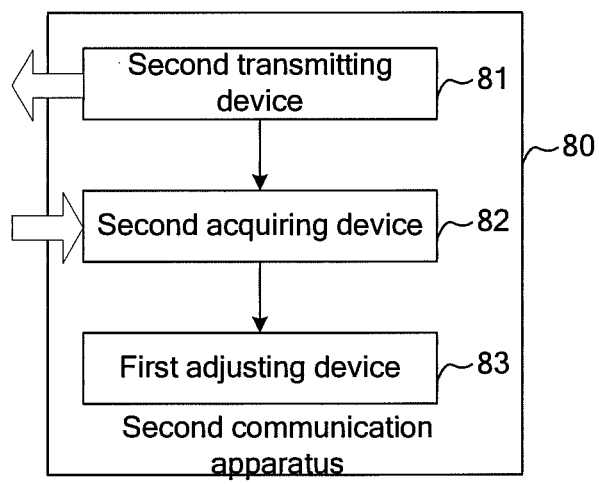
FIG. 8 is a block diagram illustrating a second communication apparatus for communicating in a base station in a multiple input multiple output communication system according to an embodiment of the present invention.

FIG. 7 is a block diagram illustrating a first communication apparatus for communicating in a base station in a multiple input multiple output communication system according to an embodiment of the present invention. As shown in FIG. 7, the first communication apparatus 70 includes a first acquiring device 71, a first determining device 72, and a first transmitting device 73. Typically, the first acquiring device 71 is disposed in the base station in the MIMO system. And FIG. 8 is a block diagram illustrating a second communication apparatus for communicating in a base station in a multiple input multiple output communication system according to an embodiment of the present invention. As shown in FIG. 8, the second communication apparatus 80 includes a second transmitting device 81, a second acquiring device 82, and a first adjusting device 83. Typically, the second communication apparatus 80 is disposed in the base station in the MIMO system. The present invention will be described from the apparatus point of view as follows in connection with FIGS. 1, 2, 3, 7 and 8.

At the side of a base station most recently joining in multi-cell MIMO collaboration, firstly, the first acquiring device 71 in its first communication apparatus 70 acquires determined downlink transmission control information of at least one determined cell, wherein the determined downlink transmission control information includes the indication information of at least one determined mobile terminal in each of the at least one determined cell.

For example, multi-cell MIMO collaboration is performed between the base station 1 and the base station 2, and the base station 1 has completed user scheduling and transmission setting including pre-coding setting, wherein the mobile terminal 21 is involved in multi-cell MIMO collaboration, then, the cell in which the base station 1 is located is called a determined cell, and the mobile terminal 21 is called a determined mobile terminal. The first acquiring device 71 in the base station 2 acquires the indication information of the mobile terminal 21, thereby knowing that the mobile terminal 21 will participate in multi-cell collaboration.

For another example, multi-cell MIMO collaboration is performed among the base stations 1, 2 and 3, and the base stations 1 and 2 have completed user scheduling and transmission setting including pre-coding setting, wherein the mobile terminals 21 and 22 are involved in multi-cell MIMO collaboration, then, the cells in which the base stations 1 and 2 are located are called determined cells, and the mobile terminals 21 and 22 are called determined mobile terminals. The first acquiring device 71 in the base station 3 acquires the indication information of the mobile terminals 21 and 22, thereby knowing that the mobile terminals 21 and 22 will participate in multi-cell collaboration.

According to different interaction mode employed between base stations, in some other embodiments of the present invention, the determined downlink transmission control information may further include one or more of channel information and downlink pre-coding information between base station(s) in determined cell(s) and determined mobile terminal(s).

Then, the base station most recently joining in multi-cell MIMO collaboration selects, via the first determining device 72 in its first communication apparatus 70, collaborative mobile terminal(s) in a cell to which the base station pertains according to the downlink transmission control information of the at least one determined cell.

For example, multi-cell MIMO collaboration is performed between the base station 1 and the base station 2, and the base station 2 is the base station most recently joining in multi-cell MIMO collaboration, then according to the downlink transmission control information of the cell in which the base station 1 is located, the first determining device 72 in the base station 2 makes a selection from the mobile terminals in the cell in which the base station 2 is located, and determines the mobile terminal 22 as a collaborative mobile terminal.

For another example, assuming that multi-cell MIMO collaboration is performed among the base stations 1, 2 and 3, and the base station 3 is the base station most recently joining in multi-cell MIMO collaboration, then according to the downlink transmission control information of the cells in which the base stations 1 and 2 are located, the first determining device 72 in the base station 3 makes a selection from the mobile terminals in the cell in which the base station 3 is located, and determines the mobile terminal 23 as a collaborative mobile terminal.

After that, the base station most recently joining in multi-cell MIMO collaboration transmits, via the first transmitting device 73 in the first communication apparatus 70, downlink data and downlink transmission control information of the selected collaborative mobile terminal(s) to base station(s) in the at least one determined cell.

For example, multi-cell MIMO collaboration is performed between the base station 1 and the base station 2, and the base station 2 is the base station most recently joining in multi-cell MIMO collaboration, and the collaborative mobile terminal determined by the base station 2 is the mobile terminal 22, then, the first transmitting device 73 in the base station 2 transmits to the base station 1 the pre-coded data transmitted to the mobile terminal 22 and the downlink transmission control information of the mobile terminal 22.

For another example, multi-cell MIMO collaboration is performed among the base stations 1, 2 and 3, and the base station 3 is the base station most recently joining in multi-cell MIMO collaboration, and the collaborative mobile terminal determined by the base station 3 is the mobile terminal 23, then, the first transmitting device 73 in the base station 3 transmits to the base stations 1 and 2 the pre-coded data transmitted to the mobile terminal 23 and the downlink transmission control information of the mobile terminal 23.

According to different interaction mode employed between base stations, in some other embodiments of the present invention, the downlink transmission control information of the collaborative mobile terminal(s) may further include one or more of channel information and downlink pre-coding information relating to the collaborative mobile terminal(s); and the downlink data of the collaborative mobile terminal(s) may be raw data or pre-coded data.

At the side of the base station of a determined cell participating in multi-cell MIMO collaboration, firstly, the base station transmits, via the second transmitting device 81 in its second communication apparatus 80, to a base station most recently joining in multi-cell MIMO collaboration the determined downlink transmission control information of the cell, wherein the determined downlink transmission control information includes the indication information of at least one determined mobile terminal in the determined cell.

For example, multi-cell MIMO collaboration is performed between the base station 1 and the base station 2, and the cell in which the base station 1 is located is a determined cell, and the mobile terminal 21 is a determined mobile terminal, the base station 2 needs to determine mobile terminal(s) to participate in multi-cell MIMO collaboration in the cell in which it is located and transmission setting of the mobile terminal(s). Then, the second transmitting device 81 in the base station 1 transmits the indication information of the mobile terminal 21 to the base station 2.

For another example, multi-cell MIMO collaboration is performed among the base stations 1, 2 and 3, and the cells in which the base stations 1 and 2 are located are determined cells, and the mobile terminals 21 and 22 are determined mobile terminals, the base station 3 needs to determine mobile terminal(s) to participate in multi-cell MIMO collaboration in the cell in which it is located and transmission setting of the mobile terminal(s). Then, the base stations 1 and 2 transmit the indication information of the mobile terminals 21 and 22, respectively, to the base station 3 via their respective second transmitting device 81.

According to different interaction mode employed between base stations, in some other embodiments of the present invention, the determined downlink transmission control information may further include one or more of channel information and downlink pre-coding information between base station(s) in determined cell(s) and determined mobile terminal(s).

Then, the base station in the determined cell acquires, via the second acquiring device 82 in its second communication apparatus 80, downlink data and downlink transmission control information of selected collaborative mobile terminal(s) from the base station most recently joining in multi-cell MIMO collaboration.

For example, multi-cell MIMO collaboration is performed between the base station 1 and the base station 2, and the cell in which the base station 1 is located is a determined cell, then the base station 1 acquires downlink data and downlink transmission control information of selected collaborative mobile terminal(s) from the base station 2 via the second acquiring device 82.

For another example, multi-cell MIMO collaboration is performed among the base stations 1, 2 and 3, and the cells in which the base stations 1 and 2 are located are determined cells, then the base stations 1 and 2 acquire downlink data and downlink transmission control information of selected collaborative mobile terminal(s) from the base station 3 via their respective second acquiring device 82.

According to different interaction mode employed between base stations, in some other embodiments of the present invention, the downlink transmission control information of the collaborative mobile terminal(s) may further include one or more of channel information and downlink pre-coding information relating to the collaborative mobile terminal(s); and the downlink data of the collaborative mobile terminal(s) may be raw data or pre-coded data.

After that, the base station in the determined cell adjusts, via the first adjusting device 83 in its second communication apparatus 80, downlink data transmission from the determined base station to the at least one determined mobile terminal according to the downlink data and the downlink transmission control information of the collaborative mobile terminal(s).

For example, multi-cell MIMO collaboration is performed between the base station 1 and the base station 2, and the cell in which the base station 1 is located is a determined cell, and the mobile terminal 21 is a determined mobile terminal, then the base station 1 adjusts, via its first adjusting device 83, downlink data transmission to the mobile terminal 21 according to the downlink data and the downlink transmission control information of the collaborative mobile terminal(s) determined by the base station 2, thereby performing interference cancellation. When adjusting the data transmission, the pre-coding of the base station 1 for the mobile terminal 21 remains unchanged.

For another example, multi-cell MIMO collaboration is performed among the base stations 1, 2 and 3, and the cells in which the base stations 1 and 2 are located are determined cells, and the mobile terminals 21 and 22 are determined mobile terminals, then the base stations 1 and 2 adjust, via their respective first adjusting device 83, downlink data transmission to the mobile terminals 21 and 22 according to the downlink data and the downlink transmission control information of the collaborative mobile terminal(s) determined by the base station 3, thereby performing interference cancellation. When adjusting the data transmission, the pre-codings of the base station 1 for the mobile terminal 21 and the base station 2 for the mobile terminal 21 remain unchanged.

The procedure of selecting collaborative mobile terminal(s) by the first determining device 72 in the first communication apparatus 70 in a base station joining in multi-cell MIMO collaboration will be described in detail as follows.

Take two-cell MIMO collaboration between the base stations 1 and 2 for example, wherein the cell in which the base station 1 is located is a determined cell and the mobile terminal 21 is a determined terminal. Then, the detailed steps of selecting collaborative mobile terminal(s) by the first determining device 72 in the base station 2 are as follows.

Firstly, the first determining device 72 in the base station 2 determines an optimum pre-coding for at least one mobile terminal in the cell in which the base station 2 is located. The downlink pre-coding matrix between the base station 1 and the mobile terminal 21 is $t'_1$. The combined downlink pre-coding matrix between the base stations 1 and 2 and the mobile terminal 21 and any mobile terminal in the cell in which the base station 2 is located may be represented by:

$$T_2 = [\, t''_1 \;\; t''_2 \,] = \begin{bmatrix} t''_{11} & t''_{12} \\ t''_{21} & t''_{22} \end{bmatrix}.$$

Since the base station 1 doesn't notify the base station 2 of the data stream S1 transmitted to the mobile terminal 21, it follows that $t''_{21}=0$. The combined pre-coding matrix $T_2$ is a block upper triangular matrix. In order to retain the transmission setting in the cell in which the base station 1 is located, it follows that $t''_{11}=t'_1$. The equivalent channels between the two base stations and the two mobile terminals may be represented by:

$$\begin{bmatrix} H'_1 \\ H'_2 \end{bmatrix} = \begin{bmatrix} h_{11} t'_1 & h_{12} \\ h_{21} t'_1 & h_{22} \end{bmatrix}.$$

Then, based on a first predetermined rule, the first determining device 72 in the base station 2 determines an optimum pre-coding for each of the at least one mobile terminal in the cell in which the base station 2 is located.

According to an embodiment of the present invention, the first predetermined rule is a decision criteria based on signal to jamming and noise ratio. In the above case of two-cell MEMO collaboration, based on the criteria of maximum signal to jamming and noise ratio, the optimum pre-coding determined by the first determining device 72 in the base station 2 for a mobile terminal is $$t''_2 = \sqrt{P_2} \times \zeta_m\!\left(\left((H''_1)^H H''_1 + \frac{N_0}{P_2} I\right)^{-1} (H''_2)^H H''_2\right).$$

According to another embodiment of the present invention, the first predetermined rule is a decision criteria based on block diagonalization. In the above case of two-cell MIMO collaboration, the optimum pre-coding determined by the first determining device 72 in the base station 2 for a mobile terminal is $t''_2 = \tilde{V}_2^{(0)} V_2^{(1)}$, where $\tilde{V}_2^{(0)}$ is in a null space of the channel space of the mobile terminal 21, i.e., $H''_1 \tilde{V}_2^{(0)} = 0, j \neq k$, and $V_2^{(1)}$ is a right-unitary matrix after singular value decomposition of $H''_2 \tilde{V}_2^{(0)}$. That is to say, the combined downlink pre-coding matrix $T_2$ satisfies block diagonalization.

According to yet another embodiment of the present invention, the first predetermined rule may be a decision criteria based on maximum signal to noise ratio.

And then, based on a second predetermined rule, the first determining device 72 in the base station 2 selects the collaborative mobile terminal(s) from at least one mobile terminal with determined optimum pre-coding.

According to an embodiment of the present invention, the second predetermined rule is to maximize system throughput.

According to another embodiment of the present invention, the second predetermined rule is to satisfy fairness among the mobile terminals.

As shown in FIG. 1, the determined collaborative mobile terminal is the mobile terminal 22, for example.

Take three-cell MIMO collaboration among the base stations 1, 2 and 3 for example, wherein the cells in which the base stations 1 and 2 are located are determined cells and the mobile terminals 21 and 22 are determined terminals. Then, the detailed steps of selecting collaborative mobile terminal(s) by the first determining device 72 in the base station 3 are as follows.

Firstly, the first determining device 72 in the base station 3 determines an optimum pre-coding; for at least one mobile terminal in the cell in which the base station 3 is located. The combined downlink pre-coding matrix between the base stations 1, 2 and 3 and the mobile terminals 21, 22, and any mobile terminal in the cell in which the base station 3 is located may be represented by:

$$T_3 = [t_1''' \ t_2''' \ t_3'''] = \begin{bmatrix} t_{11}''' & t_{12}''' & t_{13}''' \\ t_{21}''' & t_{22}''' & t_{23}''' \\ t_{31}''' & t_{32}''' & t_{33}''' \end{bmatrix}.$$

The base station 1 doesn't notify the base station 3 of the data stream S1 transmitted to the mobile terminal 21, and the base station 2 doesn't notify the base station 3 of the data stream S2 transmitted to the mobile terminal 22. The combined pre-coding matrix $T_3$ is a block upper triangular matrix. In order to retain the transmission setting in the cells in which the base stations 1 and 2 are located, it follows that $$t_1''' = \begin{bmatrix} t_1' \\ 0 \\ 0 \end{bmatrix}, t_2''' = \begin{bmatrix} t_{12}'' \\ t_{22}'' \\ 0 \end{bmatrix}.$$

The equivalent channels between the three base stations and the three mobile terminals are updated as:

$$\begin{bmatrix} H_1''' \\ H_2''' \\ H_3''' \end{bmatrix} = \begin{bmatrix} h_{11}t_1' & h_{11}t_{12}'' + h_{12}t_{22}'' & h_{13}''' \\ h_{21}t_1' & h_{21}t_{12}'' + h_{22}t_{22}'' & h_{23}''' \\ h_{31}t_1' & h_{31}t_{12}'' + h_{32}t_{22}'' & h_{33}''' \end{bmatrix}.$$

Then, based on a first predetermined rule, the first determining device 72 in the base station 3 determines an optimum pre-coding for each of the at least one mobile terminal in the cell in which the base station 3 is located.

According to an embodiment of the present invention, the first predetermined rule is a decision criteria based on signal to jamming and noise ratio. In the above case of three-cell MIMO collaboration, base on the criteria of maximum signal to jamming and noise ratio, the optimum pre-coding determined by the first determining device 72 in the base station 3 for a mobile terminal is $$t_3''' = \sqrt{P_3} \times \zeta\left(\left((H_1''')^H H_1''' + (H_2''')^H H_2''' + \frac{N_0}{P_3}I\right)^{-1}(H_3''')^H H_3'''\right).$$

According to another embodiment of the present invention, the first predetermined rule may be a decision criteria based on block diagonalization. In the above case of three-cell MIMO collaboration, based on the block diagonalization criteria, the optimum pre-coding determined by the first determining device 72 in the base station 3 for a mobile terminal is $t'''_3 = \tilde{V}_3^{(0)} V_3^{(1)}$, where $\tilde{V}_3^{(0)}$ is in a null space of the channel space of the mobile terminals 21 and 22, i.e., $$\begin{bmatrix} H_1''' \\ H_2''' \end{bmatrix} \tilde{V}_3^{(0)} = 0,$$

$j \neq k$, and $V_3^{(1)}$ is a right-unitary matrix after singular value decomposition of $H'''_3 \tilde{V}_3^{(0)}$. That is to say, the combined downlink pre-coding matrix $T_3$ satisfies block diagonalization.

According to yet another embodiment of the present invention, the first predetermined rule may be a decision criteria based on maximum signal to noise ratio.

And then, based on a second predetermined rule, the first determining device 72 in the base station 3 selects the collaborative mobile terminal(s) from at least one mobile terminal with determined optimum pre-coding.

According to an embodiment of the present invention, the second predetermined rule is to maximize system throughput.

According to another embodiment of the present invention, the second predetermined rule is to satisfy fairness among the mobile terminals.

As shown in FIG. 3, the collaborative mobile terminal determined is the mobile terminal 23, for example.

In the above embodiments, there are only one mobile terminal and one data stream participating in multi-cell MIMO collaboration in the cell in which each base station is located. How ever, those skilled in the art will understand that, it is not a limitation to the present invention, and there may be a plurality of mobile terminals and data streams participating in multi-cell MIMO collaboration in the cell in which each base station is located.

Those skilled in the art will understand that the so-called apparatus or device in the present invention may be either a hardware device or a software functional module, or even a combination of a hardware device and a software functional module.

Figure 9:
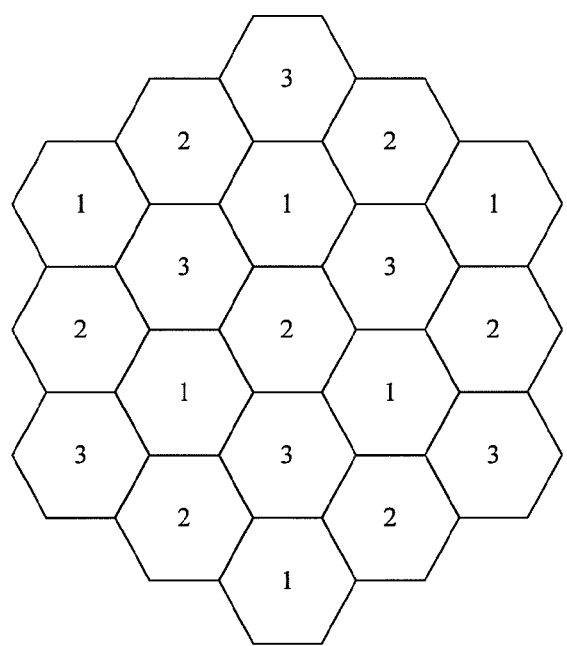
FIG. 9 is a cell topology illustrating a distributed multiple input multiple output communication system according to an embodiment of the present invention.

The methods and apparatuses of the present invention may be employed in a distributed multiple input multiple output system. FIG. 9 is a cell topology illustrating a distributed multiple input multiple output communication system according to an embodiment of the present invention. The numerals 1, 2 and 3 in FIG. 9 represent different scheduling priorities, wherein the numeral 1 represents the highest priority, and the numeral 3 represents the lowest. As shown in FIG. 9, in the multiple input multiple output communication system according to this embodiment, any two neighboring cells have different scheduling priorities. During multi-cell MIMO collaboration, the base station in each cell performs combined pre-coding and scheduling according to an order of scheduling priority. Usually, multi-cell MIMO collaboration happens between neighboring cells. Therefore, it facilitates the realization of gradual multi-cell MIMO collaboration to adopt the scheduling solution according to an order of scheduling priority. And those skilled in the art will understand that classification of scheduling priority of each cell in the system is not limited to three levels, and four or five scheduling priority levels, etc., are feasible.

In this embodiment, firstly, scheduling is performed in the cells with scheduling priority 1, and the base stations in the cells perform user selection and downlink transmission setting including pre-coding setting, and transmit collaboration requests according to the scheduling results. Now, the cells with scheduling priority 1 become determined cells.

Then, the base stations in the cells with scheduling priority 2 acquire the collaboration requests relating to the determined cells neighboring on the cells in which the base stations are located, and according to the collaboration requests as well as the scheduling and setting results of the determined cells, perform scheduling in the cells with scheduling priority 2, perform user selection and downlink transmission setting including combined pre-coding setting, and transmit collaboration requests according to the scheduling results. Now, the cells with either of scheduling priorities 1 and 2 become determined cells.

Finally, the base stations in the cells with scheduling priority 3 acquire the collaboration requests relating to the determined cells neighboring on the cells in which the base stations are located, and according to the collaboration requests and the scheduling and setting results of the determined cells, perform scheduling in the cells with scheduling priority 3, and perform user selection and downlink transmission setting including combined pre-coding setting.

The embodiments of the present invention are described above. However, the present invention is not limited to particular systems, equipments and specific protocols. And variations or modifications can be made by those skilled in the art within the scope of the appended claims.

The invention claimed is:

1. A method of communicating in a multiple input multiple output communication system, comprising:
  determining to perform multi-cell multiple input multiple output collaboration by at least a first base station and a second base station;
  acquiring determined downlink transmission control information of the first base station by the second base station, wherein the determined downlink transmission control information comprises indication information of at least one determined mobile terminal in a cell in which the first base station is located;
  selecting collaborative mobile terminal(s) according to the downlink transmission control information of the first base station by the second base station by constructing a combined downlink pre-coding matrix for each of at least one mobile terminal in a cell to which the second base station pertains according to the determined downlink transmission control information of the first base station, and based on a first predetermined rule, wherein a downlink pre-coding matrix between the first base station and the at least one determined mobile terminal is a submatrix of the combined downlink pre-coding matrix and, based on a second predetermined rule, selecting the collaborative mobile terminal(s) from the at least one mobile terminal;
  transmitting downlink data and downlink transmission control information of the selected collaborative mobile terminal(s) to the first base station by the second base station; and
  adjusting downlink data transmission from the first base station to the at least one determined mobile terminal according to the downlink data and the downlink transmission control information of the collaborative mobile terminal(s) by the first base station.

2. The method of claim 1, wherein the combined downlink pre-coding matrix is a block-triangular matrix; and the first predetermined rule is that the combined downlink pre-coding matrix shall be constructed so that a signal of a corresponding mobile terminal satisfies maximum signal to jamming and noise ratio, or that the combined downlink pre-coding matrix shall be constructed to satisfy block diagonalization.

3. The method of claim 1, wherein the second predetermined rule is to maximize system throughput or to satisfy fairness among the mobile terminals.

4. A method of communicating in a base station in a multiple input multiple output communication system, comprising:
  acquiring determined downlink transmission control information of at least one determined cell, wherein the determined downlink transmission control information comprises indication information of at least one determined mobile terminal in each of the at least one determined cell;
  selecting collaborative mobile terminal(s) in a cell to which the base station pertains according to the downlink transmission control information of the at least one determined cell by constructing a combined downlink pre-coding matrix for each of at least one mobile terminal in the cell to which the base station pertains according to the determined downlink transmission control information of the at least one determined cell, and based on a first predetermined rule, wherein a downlink pre-coding matrix relating to each determined mobile terminal in the determined cell is a submatrix of the combined downlink pre-coding matrix and, based on a second predetermined rule, selecting the collaborative mobile terminal(s) from the at least one mobile terminal in the cell to which the base station pertains; and
  transmitting downlink data and downlink transmission control information of the selected collaborative mobile terminal(s) to base station(s) in the at least one determined cell.

5. The method of claim 4, wherein the combined downlink pre-coding matrix is a block-triangular matrix.

6. The method of claim 5, wherein the first predetermined rule is that the combined downlink pre-coding matrix shall be constructed so that a signal of a corresponding mobile terminal satisfies maximum signal to jamming and noise ratio.

7. The method of claim 5, wherein the first predetermined rule is that the combined downlink pre-coding matrix shall be constructed to satisfy block diagonalization.

8. The method of claim 4, wherein the second predetermined rule is to maximize system throughput or to satisfy fairness among the mobile terminals.

9. The method of claim 4, wherein the multiple input multiple output communication system is a distributed system, and the base station has a different scheduling priority from that of base station(s) in the at least one determined cell, and combined pre-coding and scheduling are performed according to an order of scheduling priority.

10. A method of communicating in a base station in a multiple input multiple output communication system, comprising:
  transmitting to at least one other base station determined downlink transmission control information of a cell in which the base station is located, wherein the determined downlink transmission control information comprises indication information of at least one determined mobile terminal in the cell in which the base station is located;
  acquiring downlink data and downlink transmission control information of selected collaborative mobile terminal(s) from the at least one other base station, wherein the selected collaborative mobile terminal(s) are selected by the at least one other base station by constructing a combined downlink pre-coding matrix for each of at least one mobile terminal in the cell to which the at least one other base station pertains according to the determined downlink transmission control information of the at least one determined cell of the at least one other base stations, and based on a first predetermined rule, wherein a downlink pre-coding matrix relating to each determined mobile terminal in the at least one determined cell is a submatrix of the combined downlink pre-coding matrix and, based on a second predetermined rule, selecting the collaborative mobile terminal(s) from the at least one mobile terminal in the at least one cell to which the at least one of the at least one other base station pertains; and adjusting downlink data transmission from the base station to the at least one determined mobile terminal according to the downlink data and the downlink transmission control information of the collaborative mobile terminal(s).

11. The method of claim 10, wherein the multiple input multiple output communication system is a distributed system, the base station has a different scheduling priority than that of the at least one other base station, and combined pre-coding and scheduling are performed according to an order of scheduling priority.

12. A first communication apparatus for communicating in a base station in a multiple input multiple output communication system, comprising:
a first acquiring device for acquiring determined downlink transmission control information of at least one determined cell, wherein the determined downlink transmission control information comprises a downlink pre-coding matrix between a base station in each of the at least one determined cell and at least one determined mobile terminal, and the indication information of the at least one determined mobile terminal;
a first determining device for selecting collaborative mobile terminal(s) in a cell to which the base station pertains according to the downlink transmission control information of the at least one determined cell by constructing a combined downlink pre-coding matrix for each of at least one mobile terminal in the cell to which the base station pertains according to the determined downlink transmission control information of the at least one determined cell, and based on a first predetermined rule, wherein a downlink pre-coding matrix relating to each determined mobile terminal in the determined cell is a submatrix of the combined downlink pre-coding matrix and, based on a second predetermined rule, selecting the collaborative mobile terminal(s) from the at least one mobile terminal in the cell to which the base station pertains; and
a first transmitting device for transmitting downlink data and downlink transmission control information of the selected collaborative mobile terminal(s) to base station(s) in the at least one determined cell.

13. A second communication apparatus for communicating in a base station in a multiple input multiple output communication system, comprising:
a second transmitting device for transmitting to at least one other base station the determined downlink transmission control information of a cell in which the base station is located, wherein the determined downlink transmission control information comprises a downlink pre-coding matrix between the cell in which the base station is located and at least one determined mobile terminal, and the indication information of the at least one determined mobile terminal;
a second acquiring device for acquiring downlink data and downlink transmission control information of selected collaborative mobile terminal(s) from the at least one other base station, wherein the selected collaborative mobile terminal(s) are selected by the at least one other base station by constructing a combined downlink pre-coding matrix for each of at least one mobile terminal in the cell to which the at least one other base station pertains according to the determined downlink transmission control information of the at least one determined cell of the at least one other base stations, and based on a first predetermined rule, wherein a downlink pre-coding matrix relating to each determined mobile terminal in the at least one determined cell is a submatrix of the combined downlink pre-coding matrix and, based on a second predetermined rule, selecting the collaborative mobile terminal(s) from the at least one mobile terminal in the at least one cell to which the at least one of the at least one other base station pertains;
a first adjusting device for adjusting downlink data transmission from the base station to the at least one determined mobile terminal according to the downlink data and the downlink transmission control information of the collaborative mobile terminal(s).

* * * * *